(12) United States Patent
Monfort et al.

(10) Patent No.: US 9,102,221 B1
(45) Date of Patent: Aug. 11, 2015

(54) INTERNAL COMBUSTION ENGINE TO ELECTRIC MOTOR CONVERSION KIT SYSTEM

(71) Applicants: Edward Riggs Monfort, Palm Harbor, FL (US); Dennis R. Diricco, Los Altos, CA (US)

(72) Inventors: Edward Riggs Monfort, Palm Harbor, FL (US); Dennis R. Diricco, Los Altos, CA (US)

( * ) Notice: Subject to any disclaimer, the term of this patent is extended or adjusted under 35 U.S.C. 154(b) by 0 days.

(21) Appl. No.: 13/759,547

(22) Filed: Feb. 5, 2013

(51) Int. Cl.
*B60K 1/00* (2006.01)

(52) U.S. Cl.
CPC .......................................... *B60K 1/00* (2013.01)

(58) Field of Classification Search
USPC ......... 180/65.1, 291, 292, 298, 299; 248/200, 248/300
See application file for complete search history.

(56) References Cited

U.S. PATENT DOCUMENTS 6,047,942 A * 4/2000 Kennedy ........................ 248/674
8,387,728 B1 * 3/2013 Larke ........................... 180/65.1

* cited by examiner

*Primary Examiner* — Jeffrey J Restifo
*Assistant Examiner* — Erez Gurari

(57) ABSTRACT

A support assembly is for an electric motor in an operative position within a vehicle. The electric motor has a rotatable central shaft. A primary bracket has a vertically oriented first section coupled to the electric motor, a vertically oriented second section rearwardly of and at an elevation above the first section, and a third section joining the first and second sections. The second section of the primary bracket is adapted to support vehicle components including an alternator, an air conditioning compressor, and a power steering pump. The second section of the primary bracket is adapted to support a motion imparting assembly for driving the vehicle components. The motion imparting assembly includes a drive pulley secured to and rotatable with the central shaft of the electric motor and includes driven pulleys on each of the vehicle components.

1 Claim, 5 Drawing Sheets

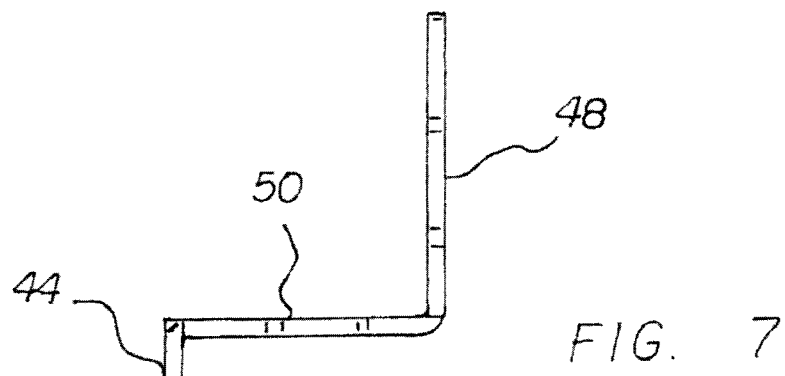
FIG. 7
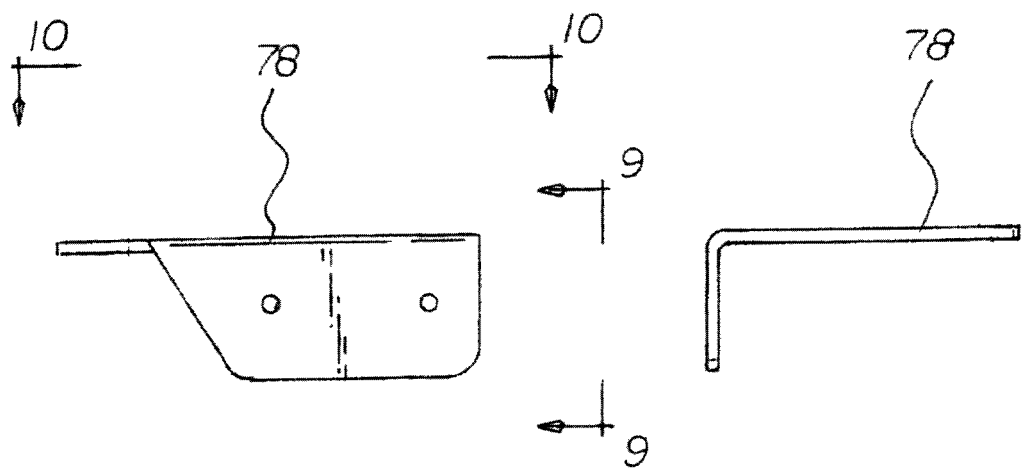
FIG. 8
FIG. 9

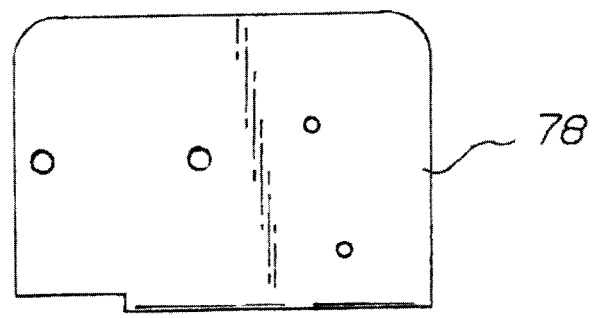
FIG. 10
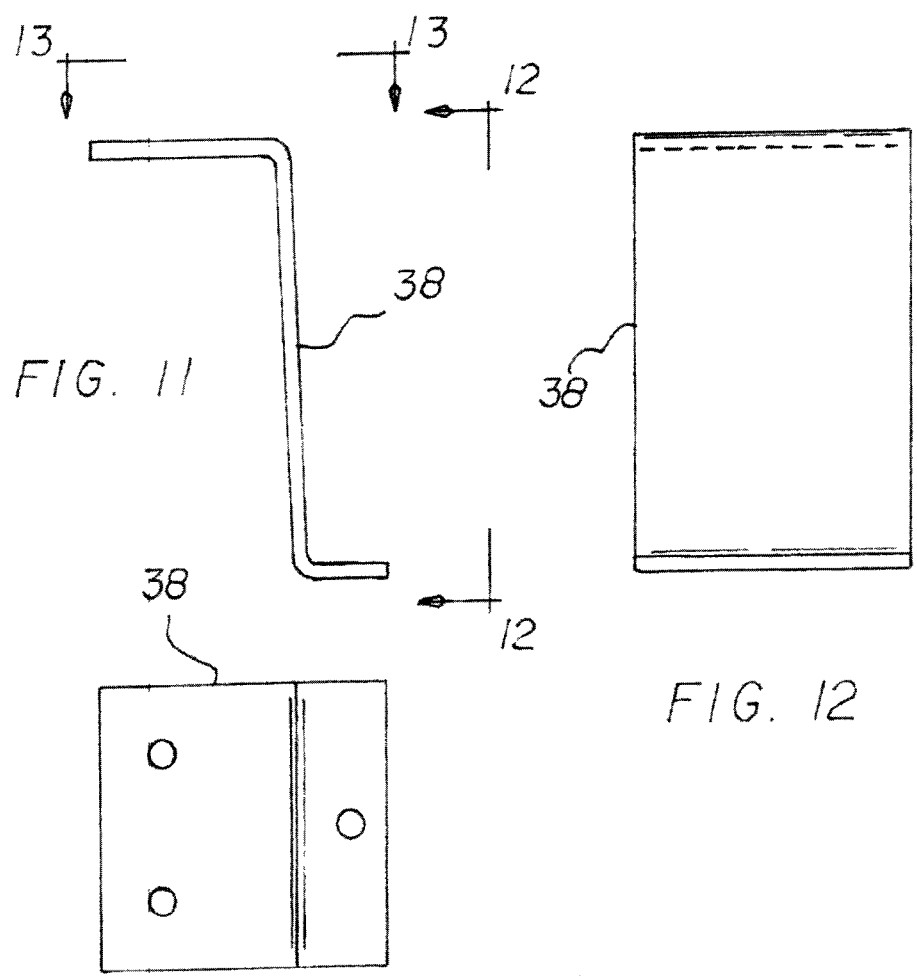
FIG. 11
FIG. 12
FIG. 13

INTERNAL COMBUSTION ENGINE TO ELECTRIC MOTOR CONVERSION KIT SYSTEM

BACKGROUND OF THE INVENTION

Field of the Invention

The present invention relates to an internal combustion engine to electric motor conversion kit system and more particularly pertains to supporting vehicle components in operative proximity to an electric direct or alternating current motor and for powering such supported vehicle components from the electric direct current motor, the supporting and powering being done in a safe, ecological, convenient and economical manner.

SUMMARY OF THE INVENTION

In view of the disadvantages inherent in the known types of engine to motor conversion kit systems of known designs and configurations now present in the prior art, the present invention provides an improved internal combustion engine to electric motor conversion kit system. As such, the general purpose of the present invention, which will be described subsequently in greater detail, is to provide a new and improved internal combustion engine to electric motor conversion kit system and method which has all the advantages of the prior art and none of the disadvantages.

To attain this, the present invention essentially comprises an internal combustion engine to electric motor conversion kit system. A support assembly is for an electric motor in an operative position within a vehicle. The electric motor has a rotatable central shaft extending through both ends of the motor. The motor is mounted to the vehicle frame through the engine mount bracket. A primary bracket has a vertically oriented first section coupled to the electric motor with the central shaft extending through the bracket, a vertically oriented second section rearwardly of and at an elevation above the first section, and a third section joining the first and second sections. The second section of the primary bracket is adapted to support vehicle components including an alternator, an air conditioning compressor, and a power steering pump. The second section of the primary bracket is adapted to support a motion imparting assembly for driving the vehicle components. The motion imparting assembly includes a drive pulley secured to and rotatable with the central shaft of the electric motor and includes driven pulleys on each of the vehicle components.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved internal combustion engine to electric motor conversion kit system which has all of the advantages of the prior art engine to motor conversion kit systems of known designs and configurations and none of the disadvantages.

It is another object of the present invention to provide a new and improved internal combustion engine to electric motor conversion kit system which may be easily and efficiently manufactured and marketed.

It is a further object of the present invention to provide a new and improved internal combustion engine to electric motor conversion kit system which is of durable and reliable constructions.

An even further object of the present invention is to provide a new and improved internal combustion engine to electric motor conversion kit system which is susceptible of a low cost of manufacture with regard to both materials and labor, and which accordingly is then susceptible of low prices of sale to the consuming public, thereby making such internal combustion engine to electric motor conversion kit system economically available to the buying public.

Lastly, it is another object of the present invention to provide an internal combustion engine to electric motor conversion kit system for supporting vehicle components in operative proximity to an electric direct or alternating current motor and for powering such supported vehicle components from the electric direct or alternating current motor, the supporting and powering being done in a safe, ecological, convenient and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front elevational view of the primary bracket of FIGS. 1, 2 and 3.

FIGS. 6 and 7 are plan and end elevational views taken along lines 6-6 and 7-7 of FIG. 5.

FIG. 8 is a side elevational view of a supplemental bracket shown in FIGS. 1, 2 and 3.

FIG. 9 is an end elevational view taken along line 9-9 of FIG. 8.

FIG. 10 is a plan view taken along line 10-10 of FIG. 8.

FIG. 11 is a side elevational view of a side motor support shown in FIGS. 1, 2 and 3.

FIG. 12 is an end elevational view of a side motor support taken along line 12-12 of FIG. 11.

FIG. 13 is a plan view taken along line 13-13 of FIG. 11.

The same reference numerals refer to the same parts throughout the various Figures.

DESCRIPTION OF THE PREFERRED EMBODIMENT

Figure 1:
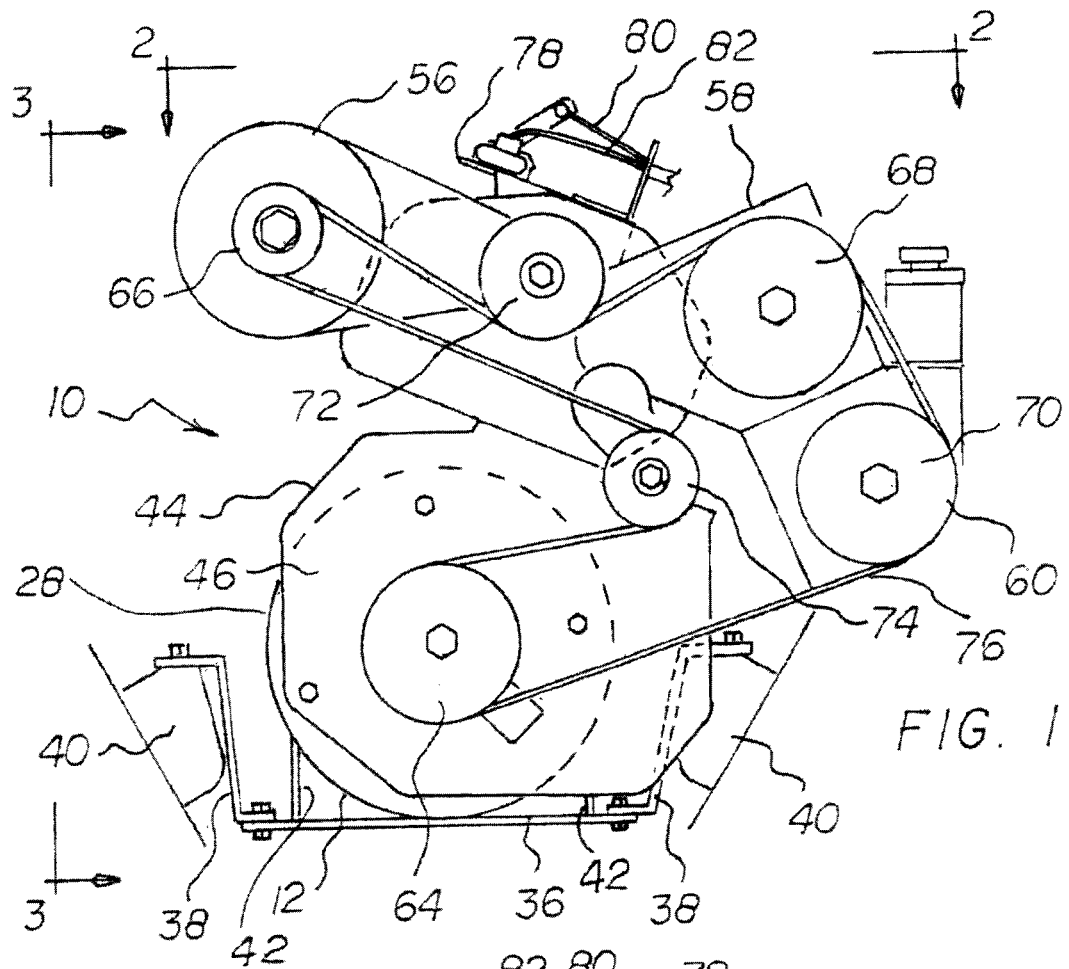
FIG. 1 is a front elevational view of an internal combustion engine to electric motor conversion kit system constructed in accordance with the principles of the present invention.
Figure 2:
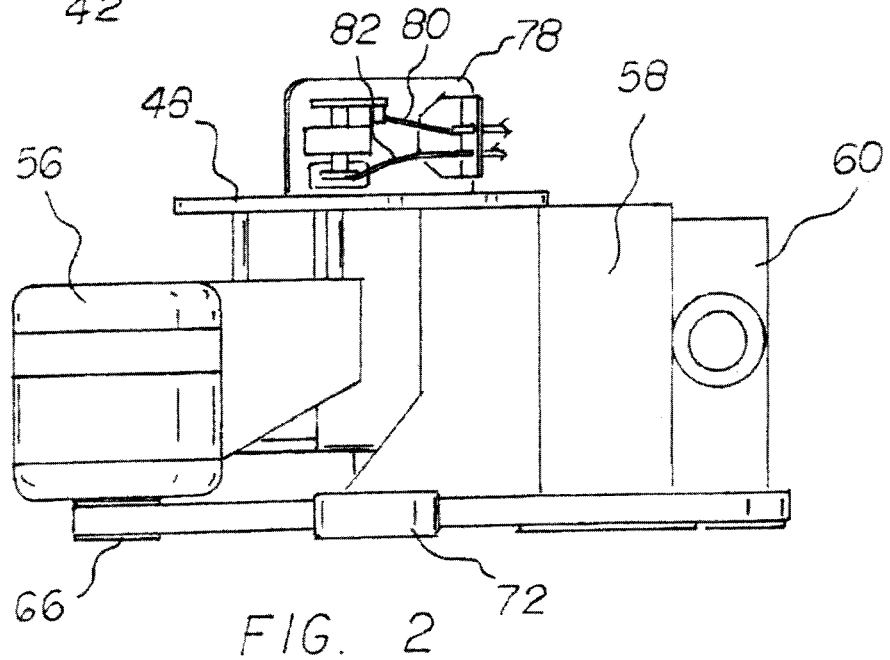
FIG. 2 is a plan view of the kit system taken along line 2-2 of FIG. 1.
Figure 3:
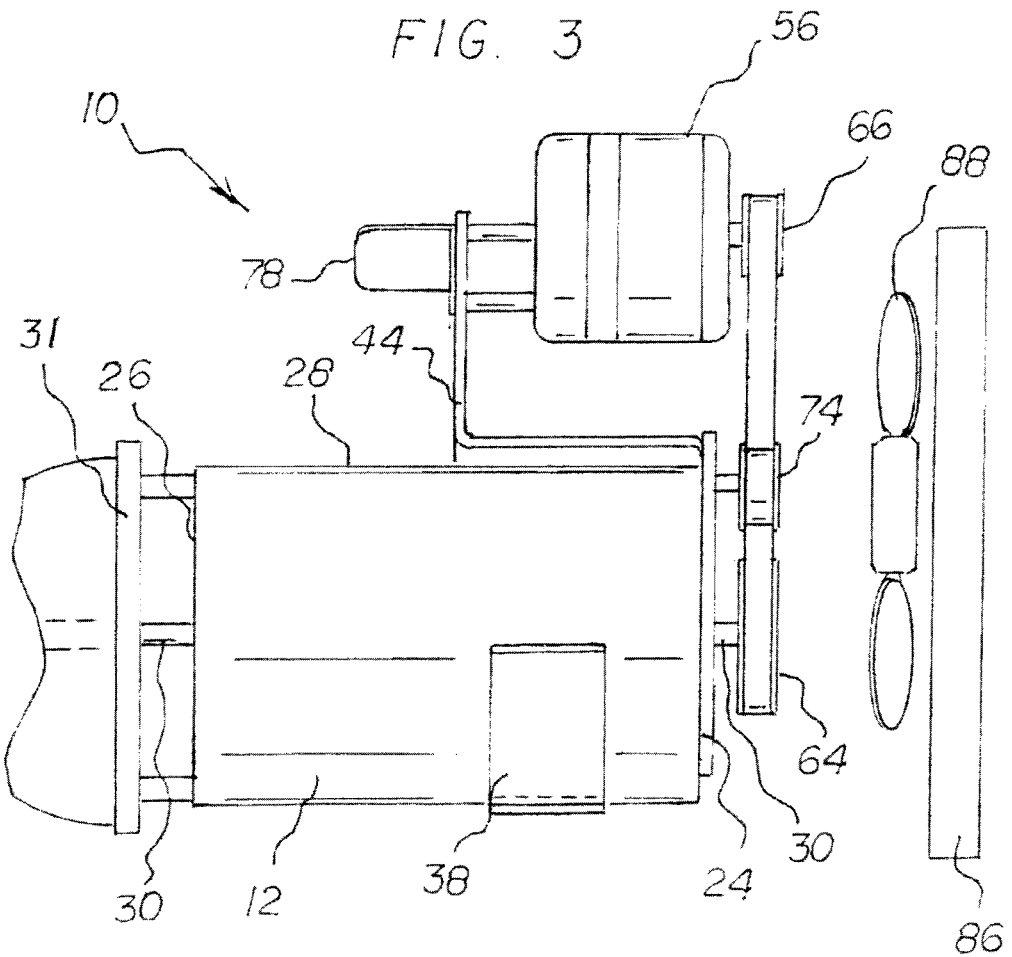
FIG. 3 is a front elevational view of the kit system taken along line 3-3 of FIG. 1.
Figure 4:
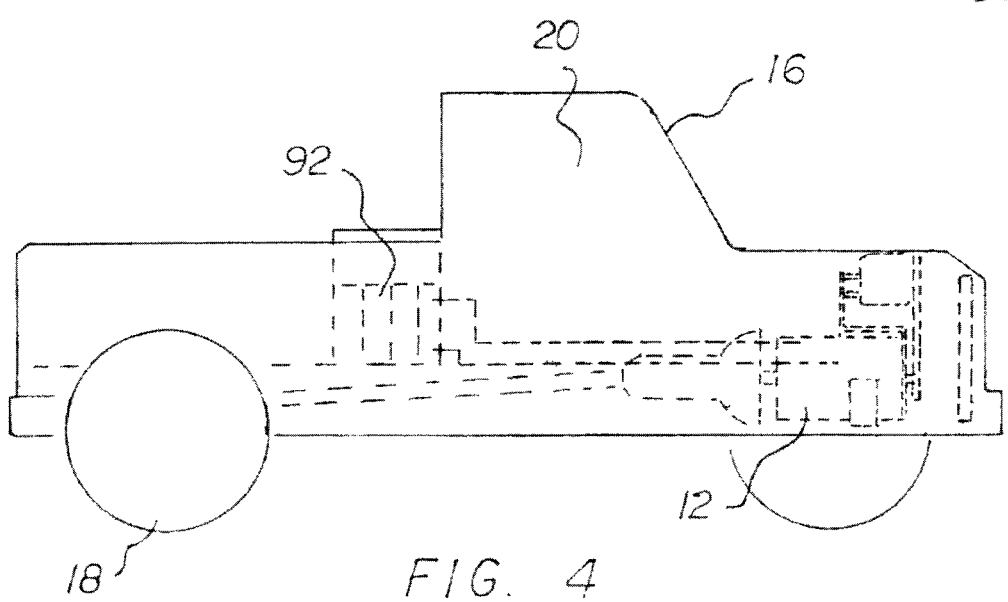
FIG. 4 is a side elevational view of a vehicle equipped with the kit system of the prior Figures.
Figures 5, 6:
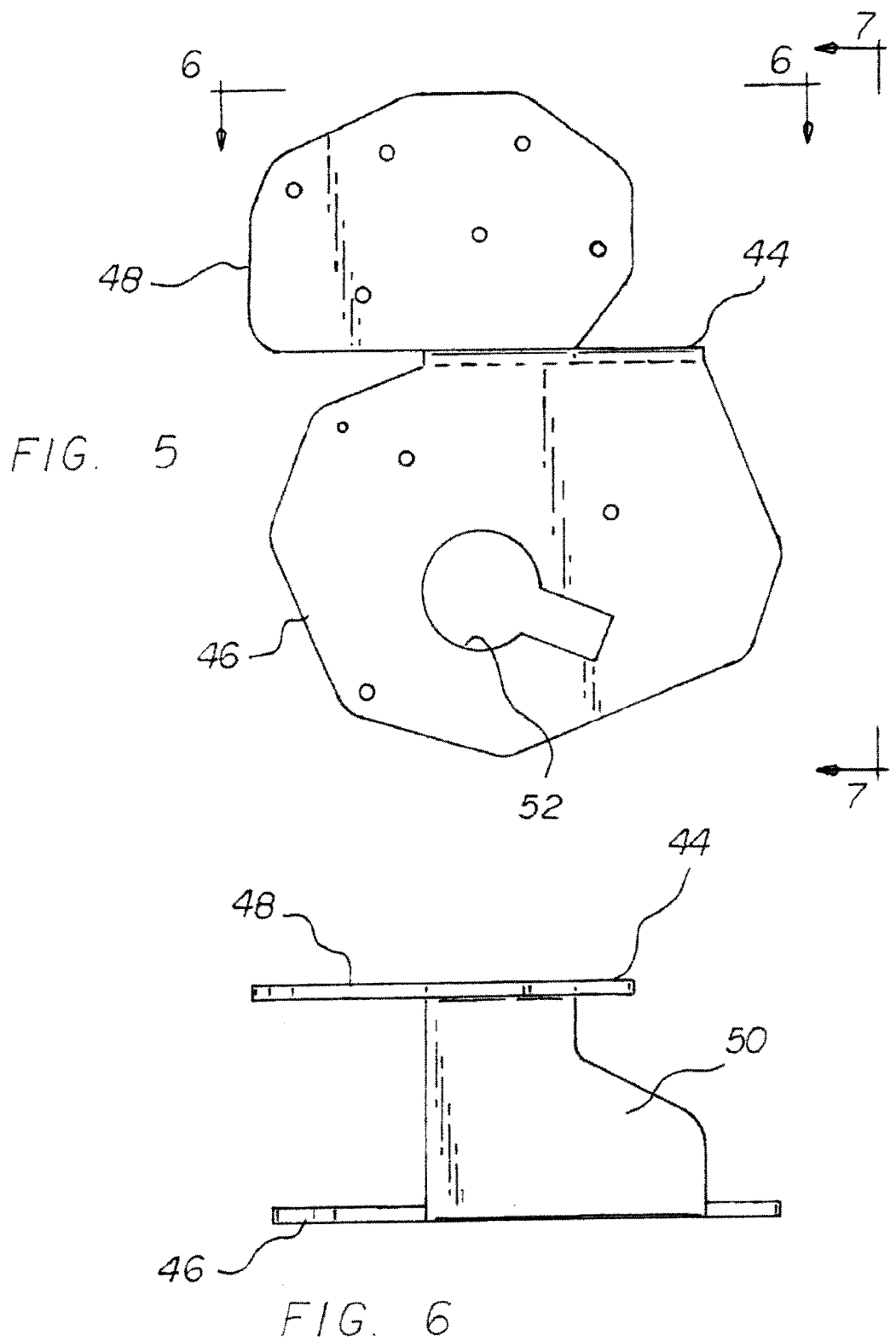

With reference now to the drawings, and in particular to FIG. 1 thereof, the preferred embodiment of the new and improved internal combustion engine to electric motor conversion kit system embodying the principles and concepts of the present invention and generally designated by the reference numeral 10 will be described.

The present invention, the internal combustion engine to electric motor conversion kit system 10 is comprised of a plurality of components. Such components in their broadest context include a support assembly, and a primary bracket. Such components are individually configured and correlated with respect to each other so as to attain the desired objective.

First provided is a vehicle 16. The vehicle has a plurality of wheels 18. The vehicle has an operator controlled region 20.

The electric direct current motor is provided within the vehicle. The electric direct or alternating current motor has a forward end 24. The electric direct or alternating current motor has a rearward end 26. The electric direct or alternating current motor has a cylindrical side wall 28. The electric direct or alternating current motor has a central shaft 30. The central shaft has a rearward section. The rearward section is provided within the electric direct or alternating current motor. The central shaft has a forward section. The forward section is provided forward of the electric direct or alternating current motor. The central shaft is rotatable about a horizontal axis.

A support assembly 34 is provided. The electric direct or alternating current motor is in an operative position. The support assembly includes a central motor support 36. The support assembly includes side motor supports 38. The support assembly includes motor mounts 40. The motor mounts couple the central and side motor supports to the vehicle. The support assembly also includes two vertically extending lateral brackets 42. The brackets couple the side wall of the electric direct or alternating current motor to the central motor support.

A primary bracket 44 is provided. The primary bracket has a vertically oriented first section 46. The first section is removably coupled to the forward end of the electric direct or alternating current motor. The primary bracket has a vertically oriented second section 48. The section is provided rearwardly of and above the first section. The primary bracket has a third section 50. The third section is provided perpendicular to and joins the first and second sections. An aperture 52 is provided. The aperture is provided in the first section in a key-hole shape for the passage of wires and the central shaft.

Vehicle components include an alternator 56. The vehicle components include an air conditioning compressor 58. The vehicle components include a power steering pump 60. The vehicle components are rotatably coupled to the second section of the primary bracket. It should be understood that one or more of the various vehicle components may be utilized in a single vehicle.

A motion imparting assembly for driving the vehicle components is provided. The motion imparting assembly includes a drive pulley 64. The drive pulley is secured to and rotatable with the central shaft. The motion imparting assembly also includes a driven pulley 66. The driven pulley is provided on the alternator or additional alternators. A driven pulley 68 is provided on the air conditioning compressor. A driven pulley 70 is provided on the power steering pump. The motion imparting assembly also includes an idler pulley 72. The motion imparting assembly includes a tensioning pulley 74. The motion imparting assembly also includes a belt 76. The belt is movable in a vertical plane and operatively couples the drive pulley and the driven pulleys and the idler and tensioning pulleys. It should be understood that one or more of the various vehicle components of the motion imparting assembly may be utilized in a single vehicle.

A supplemental bracket 78 is provided. The supplemental bracket is secured to the second section of the primary bracket at an elevation above the third section. Cable lines 80, 82 are provided. Cable lines are mounted on the supplemental bracket. In this manner the speed of the electric direct or alternating current motor and the vehicle is increased and decreased.

Further provided is a radiator 86. A cooling fan 88 is provided. The radiator and cooling fan are positioned forward of the electric direct or alternating current motor or off the motor shaft as well. In this manner cooling of the electric direct or alternating current motor and the vehicle components is provided.

Provided last is a battery pack 92 and controller. The battery pack and controller are provided in the vehicle rearwardly of the operator controlled region or in place of the gas tank. In this manner the electric direct or alternating current motor is powered and controlled.

It should be understood that the electric motor has the option to remain activated after stopping or, in the alternative, to become inactivated after stopping. In addition, the vehicle is adapted to be a rear wheel drive, a front wheel drive or a four wheel drive vehicle.

The kit of the present invention allows integration with original equipment manufacturers factory computers through Can-Bus and similar communication with the original equipment manufacturers vehicle computers.

This is the first ever kit that allows you to replace your internal combustion engine with an electric motor. The engine is removed and then replaced with an electric motor. The electric motor is attached directly to the transmission with an adaptor plate 31 and attach the accessories in an internal combustion engine pattern or method. The electric motor is bolted to OEM (original equipment manufacturer) engine rubber mounts. A patented bracket is then mounted to the electric motor exposed face opposite of the transmission. This bracket allows the bolting-on of OEM devices such as at least one pulley, at least one alternator, at least one compressor, at least one pulley tensioner and at least one belt allowing all of your necessities to be kept as if you were running on an internal combustion engine.

The patented bracket allows a person to install an easy, all-electric, bolt-on kit. It allows the vehicle to be driven as if it were an internal combustion engine vehicle. This bracket gives the consumer a seamless transition from internal combustion engine to electric motor with an easy, bolt-on kit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An internal combustion engine to electric motor conversion kit system for supporting vehicle components in operative proximity to an electric direct/alternating current motor and for powering such supported vehicle components from the electric direct/alternating current motor, the supporting and powering being done in a safe, ecological, convenient and economical manner, the system comprising, in combination:

a vehicle having a plurality of wheels and an operator controlled region, the electric direct/alternating current motor being within the vehicle, the electric direct/alternating current motor having a forward end and a rearward end and a cylindrical side wall, the electric direct/alternating current motor having a central shaft, the central shaft having a rearward section within the electric direct/alternating current motor and a forward section extending forward of the electric direct/alternating current motor, the central shaft being rotatable about a horizontal axis;

a support assembly for retaining the electric direct/alternating current motor in an operative position, the support assembly including a central motor support and side motor supports, the motor mounts, the motor mounts coupling the central and side motor supports to the vehicle, the support assembly also including two vertically extending lateral brackets coupling the side wall of the electric direct/alternating current motor to the central motor support;

a primary bracket formed with a vertically oriented first section removably coupled to the forward end of the electric direct/alternating current motor, the primary bracket formed with a vertically oriented second section rearwardly of and above the first section, the primary bracket formed with a third section perpendicular to and joining the first and second sections, an aperture in the first section in a key-hole shape for the passage of wires and the central shaft;

vehicle components including at least one alternator and at least one air conditioning compressor and at least one power steering pump, the vehicle components being rotatably coupled to the second section of the primary bracket;

a motion imparting assembly for driving the vehicle components, the motion imparting assembly including at least one drive pulley secured to and rotatable with the central shaft, the motion imparting assembly also including at least one driven pulley on the at least one alternator, at least one driven pulley on the at least one air conditioning compressor, and at least one driven pulley on the at least one power steering pump, the motion imparting assembly also including at least one idler pulley and at least one tensioning pulley, the motion imparting assembly also including at least one belt movable in a vertical plane and operatively coupling the at least one drive pulley and the at least one driven pulleys and the at least one idler and tensioning pulleys;

a supplemental bracket secured to the second section of the primary bracket at an elevation above the third section, cable lines mounted on the supplemental bracket to increase and decrease the speed of the electric direct/alternating current motor and the vehicle;

a radiator and a cooling fan, the radiator and cooling fan being positioned forward of the electric direct/alternating current motor to facilitate cooling of the electric direct/alternating current motor and the vehicle components; and a battery pack and controller in the vehicle for powering and controlling the electric direct/alternating current motor.

* * * * *